US012765530B2

(12) United States Patent
Morse

(10) Patent No.: US 12,765,530 B2
(45) Date of Patent: Oct. 20, 2026

(54) FISHING ROD HOLDER FOR AUTOMATICALLY HOOKING FISH

(71) Applicant: Kenneth Morse, Coushatta, LA (US)

(72) Inventor: Kenneth Morse, Coushatta, LA (US)

( * ) Notice: Subject to any disclaimer, the term of this patent is extended or adjusted under 35 U.S.C. 154(b) by 200 days.

(21) Appl. No.: 18/138,084

(22) Filed: Apr. 23, 2023

(65) Prior Publication Data

US 2024/0147980 A1 May 9, 2024

Related U.S. Application Data

(60) Provisional application No. 63/423,485, filed on Nov. 7, 2022.

(51) Int. Cl.
*A01K 97/11* (2006.01)

(52) U.S. Cl.
CPC .................................... *A01K 97/11* (2013.01)

(58) Field of Classification Search
CPC ................................ A01K 97/11; A01K 97/12
USPC .............................................................. 43/15
See application file for complete search history.

(56) References Cited

U.S. PATENT DOCUMENTS 2,564,840 A * 8/1951 Glenn .................... A01K 97/11 43/16
2,804,277 A * 8/1957 Kinder ................... A01K 97/11 43/16
2,996,824 A * 8/1961 Faycosh ................. A01K 97/11 43/16
3,619,931 A * 11/1971 Brummett .............. A01K 97/11 43/15
3,914,894 A * 10/1975 Kobza .................... A01K 97/11 43/15
3,956,845 A 5/1976 Hunnicutt
4,231,178 A * 11/1980 Black ..................... A01K 91/06 43/16
4,235,035 A * 11/1980 Guthrie .................. A01K 97/11 43/15
4,397,113 A * 8/1983 Pinson ................... A01K 97/11 43/15
4,750,286 A 6/1988 Gray
4,823,493 A 4/1989 Gray
4,924,617 A 5/1990 Parent
4,944,106 A 7/1990 Wu
5,076,001 A 12/1991 Coon
5,245,778 A 9/1993 Gallegos
5,247,759 A 9/1993 Noriega
5,359,802 A * 11/1994 Gutierrez ............... A01K 97/11 43/16
5,408,779 A 4/1995 Parker
5,499,469 A 3/1996 Guillemette
5,524,376 A 6/1996 Flisak
5,809,684 A 9/1998 Carter
5,813,161 A 9/1998 Yai
5,833,156 A 11/1998 Park
(Continued)

*Primary Examiner* — Timothy D Collins
*Assistant Examiner* — Brittany A Lowery

(57) ABSTRACT

A fishing rod holder for holding a conventional fishing poles include rigid hoops to include a conventional fishing pole handle therein. The invention includes a trigger and trigger setting mechanism using a tension setting mechanism, actuating arm, trigger, and spring to set the fishing rod holder at a desired sensitivity. The fishing rod holder uses spring recoil energy to snap the fishing rod holder to quickly return to the resting position to hook a fish.

3 Claims, 15 Drawing Sheets

(56) References Cited

U.S. PATENT DOCUMENTS

| | | | | |
|---|---|---|---|---|
| 5,873,191 | A | 2/1999 | Bova | |
| 5,903,998 | A * | 5/1999 | Hawkins | A01K 97/11 43/15 |
| 6,050,019 | A | 4/2000 | Anderson | |
| 6,094,851 | A | 8/2000 | Guidry | |
| 6,336,287 | B1 * | 1/2002 | Lobato | A01K 97/11 43/16 |
| 6,430,864 | B1 | 8/2002 | Thomas | |
| 7,017,296 | B2 | 3/2006 | Templeman | |
| 7,162,828 | B1 | 1/2007 | Marina | |
| 7,650,712 | B2 | 1/2010 | Lou | |
| 11,297,815 | B2 | 4/2022 | Sutherland | |
| 2002/0162270 | A1 * | 11/2002 | Fayerman | A01K 97/11 43/17 |
| 2003/0159325 | A1 | 8/2003 | Templeman | |

* cited by examiner

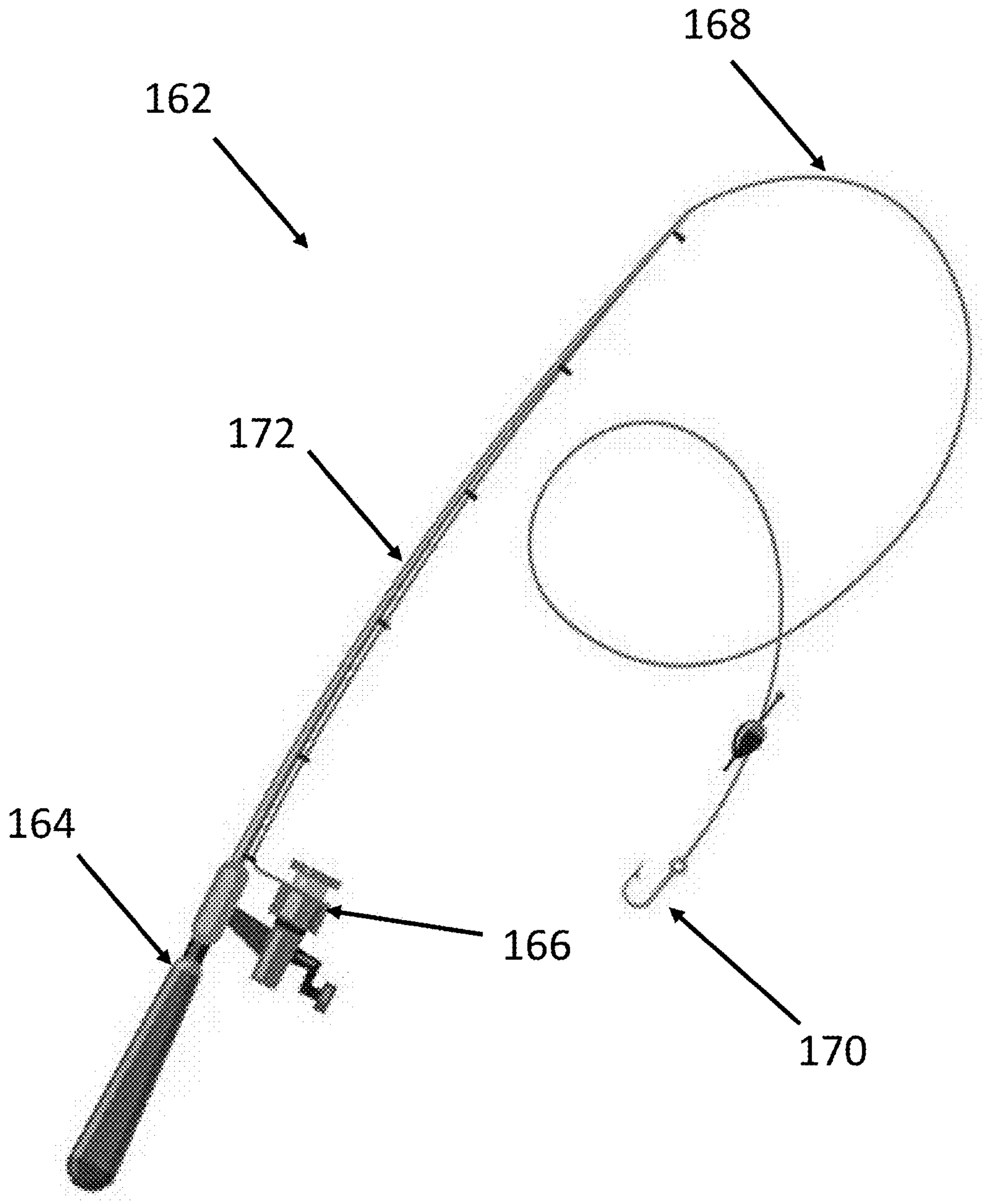
Figure 15-Prior Art

FISHING ROD HOLDER FOR AUTOMATICALLY HOOKING FISH

FIELD OF THE INVENTION

This invention relates generally to fishing rod holders. More specifically, the invention relates to a fishing rod holder for use in hooking a fish without human intervention.

BACKGROUND OF THE INVENTION

"Fishing" is a favorite past time of many adventurers. As used herein, the act of fishing includes using a conventional fishing rod, attached to a fishing line, which is further attached to a lure or a hook. The fisherman will typically toss his lure into a pond, lake river or the like, to attract the fish to be caught. Once the lure attracts the fish, the fish may bite the lure. When the fish bites the lure, the fisherman may draw back on the fishing rod to secure his catch. Since the lure will also have hooks on it, a fish that bites the lure risks getting hooked by the lure when the fisherman draws back the fishing pole to ensure the hooks dig into the fish's inner mouth.

Some fishermen use a technique called "tight-lining." In tight lining, the fisherman will ordinarily "bait his hook" with an item that will entice the fish to bite the hook. For example, a fisherman may affix a worm, snail, grub, dough, or the like that the fish will want as a meal. In tight lining, the fisherman will cast the fishing hook, including the bate, into the water where there may be fish. The term "tight lining" refers to the position of the fishing line relative to the fishing pole and the water. That is the fishing line draws a straight tight line from the fishing pole to the water. The effectiveness of tight line fishing is that when the fish bites the bait, then the line will respond to the fish's bite. The response from the fish's bite is typically a pull or trembling on the line that is experienced at the pole. Specifically, when the fish bites the bate the pull of the bite will cause the tip of the fishing pole to dip toward the direction of the pull. When the tip of the fishing pole dips, the is an indication that the there is a fish ready to be hooked. The specifics of the tight line fishing technique are well known. As such, tight line fishing techniques will not be discussed herein for brevity.

As noted, to ensure that the fish is properly hooked, once the fisherman sees the fishing pole dip indicating that a fish is at the end of the tight line, the fisherman may quickly draw back on the fishing rod to ensure that the hook firmly affixes itself to the fish's mouth. This is called "setting the hook" or "hooking a fish." A fish that is properly hooked may be brought to the bank as a successful catch of a fish. A fish that is not properly hooked may not be brought to the bank to be successfully caught. Devices currently exist for helping a fisherman set the hook.

What is needed is an apparatus that may hold a fisherman's fishing pole and will hook a fish without the fisherman's intervention. It is also needed for the apparatus to be configured to be used with any size fishing pole able to be cast by an ordinary fisherman.

SUMMARY OF THE INVENTION

The present invention provides a fishing rod holder designed to assist a fisherman in hooking a fish when the fisherman's fishing pole is unattended. In one exemplary embodiment, the fishing rod holder of the present invention includes A fishing rod holder for automatically hooking a fish comprises:

1. A fishing rod holder including:
   a. a first elongated member, the first elongated member including a first elongated member proximal end, a first elongated member distal end, a first elongated member first elongated surface, a first elongated member second elongated surface, a first elongated member first elongated surface midpoint, wherein the first elongated member midpoint is located between the first elongated member proximal end and the first elongated member distal end;
   b. a second elongated member, the second elongated member including a second elongated member proximal end, a second elongated member distal end, a second elongated member first elongated surface, a second elongated member second elongated surface, wherein the second elongated member includes a second elongated member first elongated surface midpoint, wherein the second elongated member first elongated surface midpoint is located between the second elongated member proximal end and the second elongated member distal end, wherein the first elongated member distal end is pivotably connected to the second elongated member proximal end at the second elongated member second elongated surface;
   c. a third elongated member, the third elongated member including a third elongated member proximal end, a third elongated member distal end, a third elongated member first elongated surface, a third elongated member second elongated surface, a third elongated member third elongated surface, wherein the third elongated member first elongated surface is affixed the second elongated member first elongated surface;
   d. a coil spring having a coil spring first end and a coil spring second end, wherein the coil spring first end is affixed to the third elongated member proximal end, and wherein the coil spring second end is affixed to the first elongated member first elongated surface;
   e. a first rigid loop affixed to the second elongated member, wherein said first rigid loop is affixed between the second elongated member proximal end and the second elongated member distal end;
   f. a second rigid loop affixed to the second elongated member second elongated surface, wherein the second rigid loop is affixed between the second elongated member proximal end and second elongated member distal end, wherein the;
   g. a trigger affixed to the distal end of the second elongated member;
   h. a trigger setting mechanism affixed to the first elongated member second elongated face; and
   i. a trigger safety affixed to the first elongated member first elongated face;
   j. a actuating arm have an actuating arm proximal end and an actuating arm distal end, wherein the actuating arm distal end is rotatably affixed to the trigger, and wherein the actuating arm proximal end is rotatably affixed to the trigger setting mechanism.
2. A fishing rod holder according to claim 1, wherein the trigger comprises a trigger first loop, wherein the trigger first loop includes a trigger first loop first section and a trigger first loop second section, wherein the trigger first loop first section and the trigger second loop second section are diametrically opposite, wherein the trigger further includes a trigger second loop, wherein the trigger second loop includes a trigger second loop first section and a trigger second loop second section, wherein the trigger first loop first section and the trigger second loop second section are diametrically opposite, wherein the trigger first loop first section is affixed to the second elongated member first elongated surface, wherein the trigger first loop second section is pivotably connected to the trigger second loop first section, and wherein the trigger second loop second section is rotatably connected to the actuating arm proximal end.

3. A fishing rod holder according to claim 2, wherein the trigger setting mechanism includes:

a. an elongated trigger setting member, wherein said elongated trigger setting member includes an elongated trigger setting member proximal end and an elongated trigger setting member distal end, wherein said elongated trigger setting member proximal end is convex, wherein the elongated trigger member is rotatably connected to actuating arm proximal end, wherein the elongated trigger member is further rotatably affixed to the distal end of the third elongated member;

b. a tension setting disk affixed to the distal end of the first elongated member second elongated face;

c. a trigger setting tension set screw affixed to the first elongated member second elongated face.

A fishing rod holder according to the present invention may be used by fishermen to hook a fish with no human intervention. In one aspect, the fishing rod holder may be affixed to ground, for example, when the fisherman is fishing from the bank. In another aspect, the fishing rod holder of the present invention may be affixed to a watercraft. In either instance, the fishing rod holder is affixed to a surface that provides a secure foundation from which to reinforce the fishing rod's recoil action.

In another aspect, the present invention includes a trigger setting mechanism that allows the fisherman to manually control the sensitivity at which the trigger activates. In yet another aspect, the present invention is able to be used with fishing poles of any size.

BRIEF DESCRIPTION OF THE DRAWING FIGURES

The following description may be understood with reference to the below drawings and figures, wherein the reference numbers indicate elements of the invention, and wherein:

FIG. 15 is an exemplary prior art fishing pole that may be used with this invention.

DETAILED DESCRIPTION OF THE INVENTION

Figure 1:
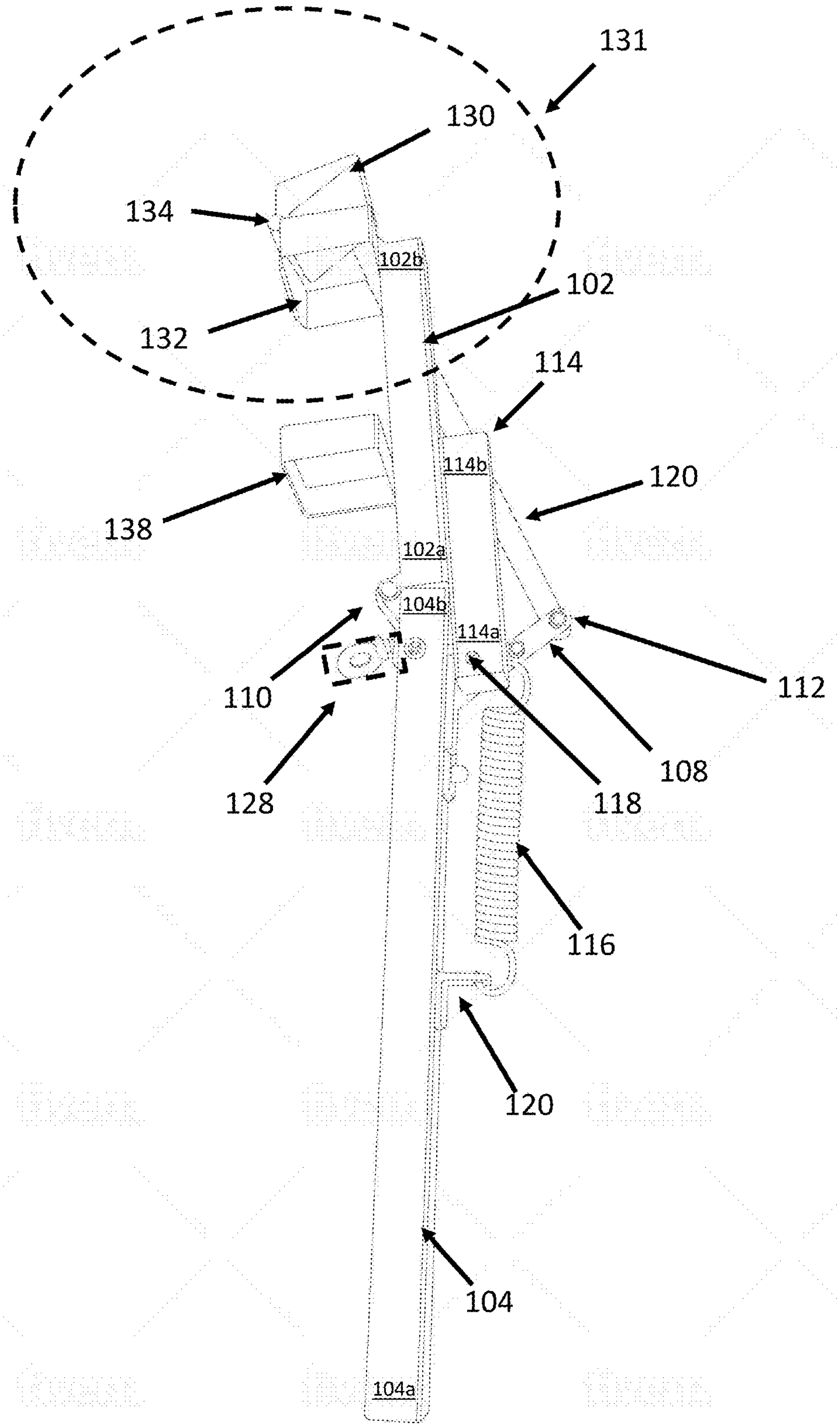
FIG. 1 is an exemplary depiction of a side perspective fishing rod holder in resting position according to the present invention.

The present invention teaches innovations not found in the prior art. The present invention teaches a fishing rod holder that can automatically hook a fish for a fisherman, without the fisherman's intervention. The terms pivoting, pivot, rotate or variations thereof are used herein to teach the physical relationship between the elements. Such pivoting may be accomplished using pins, dowels, flange bearing, bearing washers, screws, washers, and nuts, or any suitable physical coupling that permits one element of the invention to pivot with respect to another element of the invention. Consequently, when discussing "pivot points" or that elements are pivotably "connected" herein, what is taught is the use of the aforementioned pivoting mechanisms permitting the invention's elements taught to pivot one with respect to the other.

Further, various elements are discussed herein as being affixed or attached to adjacent elements. In such instance, the elements may be affixed on to the other using any conventional method for affixing or attaching one element to another. For example, elements of this invention that are affixed or attached one to another using welding, epoxy, soldering, brazing, riveting, or using mechanical fasteners.

FIG. 15 shows a conventional fishing rod 162 that may be useful with the present invention. Fishing rod 162 may include a fishing reel 166 attached to a staff 172 (e.g., a rod). Fishing reel 166 may be wound with fishing line 168 that may be strung up staff 166 an out the staff 166. The fishing line may further include a fishing hook 170, which may be used to hook a fish (not shown). Conventional fishing rods, and the manner of using a fishing rod to hook, set or catch feel, are well known. As such, conventional fishing rods, and how fishing rods are used, will not be discussed herein for brevity.

Figure 2:
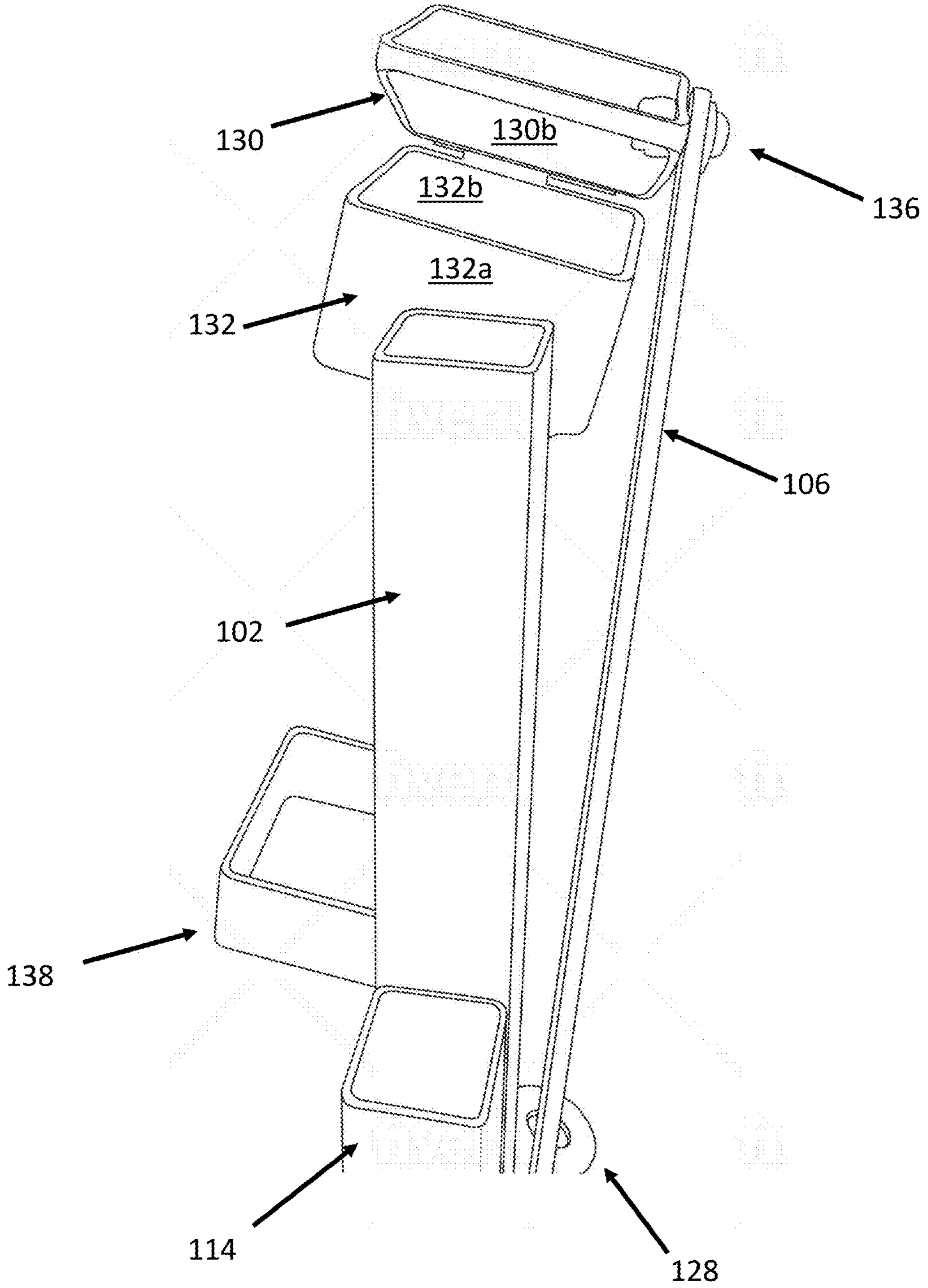
FIG. 2 is an exemplary overhead depiction of a fishing rod holder according to the present invention.

FIG. 1 depicts a side-facing view and FIG. 2 depicts top facing view of a fishing rod holder 100 according to various aspects of the present invention. Fishing rod holder 100 comprises a first elongated member 104. First elongated member 104 further including a first elongated member proximal end 104*a*, a first elongated member distal end 104*b*, a first elongated member first elongated surface 101, first elongated member second elongated surface 103, a first elongated member first elongated surface midpoint 103*a*, wherein the first elongated member midpoint 103*a* is located between the first elongated member proximal end 104*a* and the first elongated member distal end 104*b*.

Fishing rod holder 100 further includes a second elongated member 102, the second elongated member including a second elongated member proximal end 102*a*, a second elongated member distal end 102*b*, a second elongated member first elongated surface 105, a second elongated member second elongated surface 107, wherein the second elongated member includes a second elongated member first elongated surface midpoint 105*a*, wherein the second elongated member first elongated surface midpoint 105*a* is located between the second elongated member proximal end 102*a* and the second elongated member distal end 102*b*. In one exemplary embodiment, first elongated member distal end 104*b* is pivotably connected to the second elongated member proximal end 102*a* at pivot limiting hinge 110. Pivot limiting hinge 110 permits first elongated member 104 to pivot relative to second elongated member 102.

Figure 6:
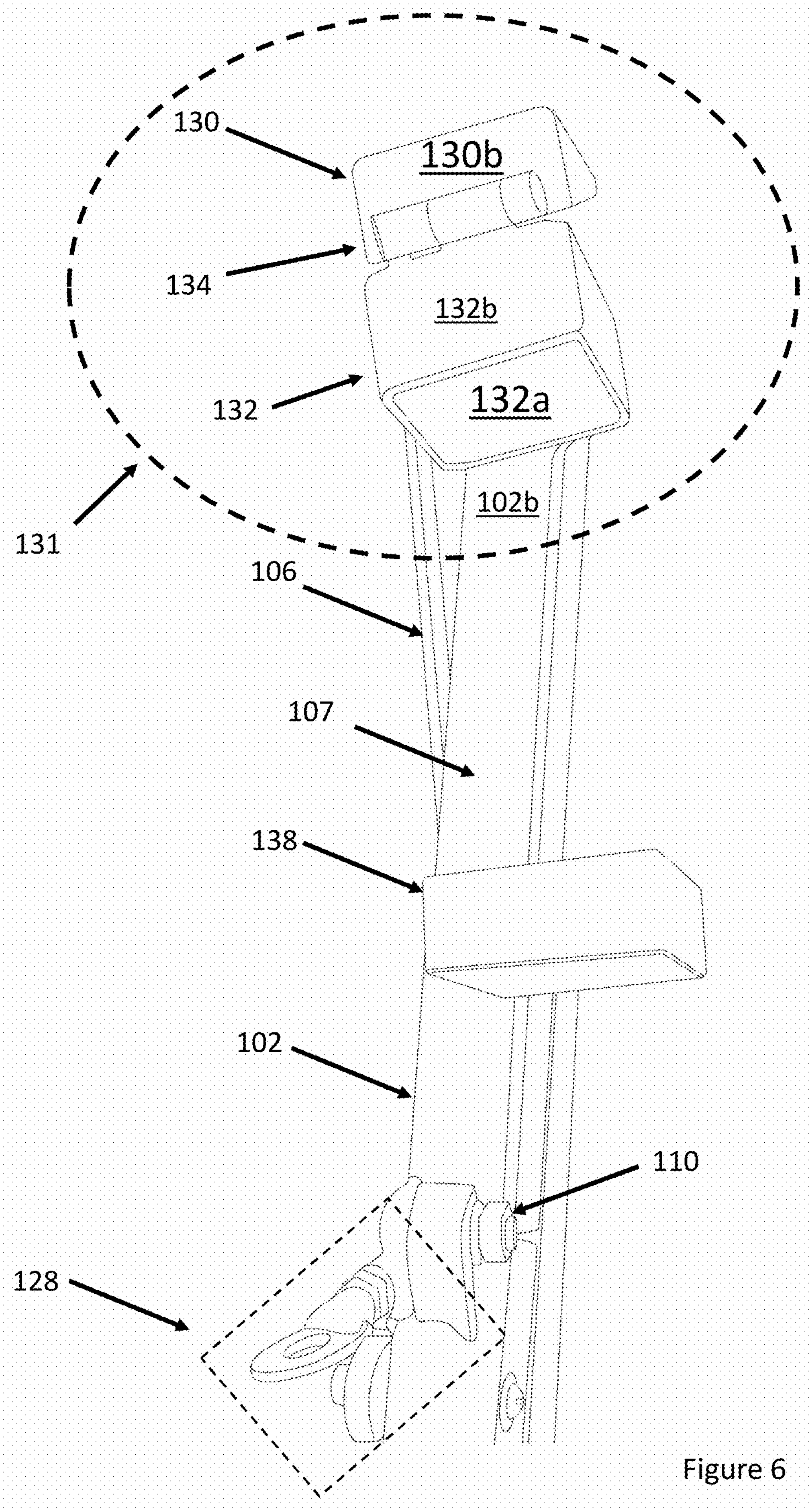
FIG. 6 is an exemplary depiction of the trigger and trigger setting mechanism according to the present invention.
Figure 7:
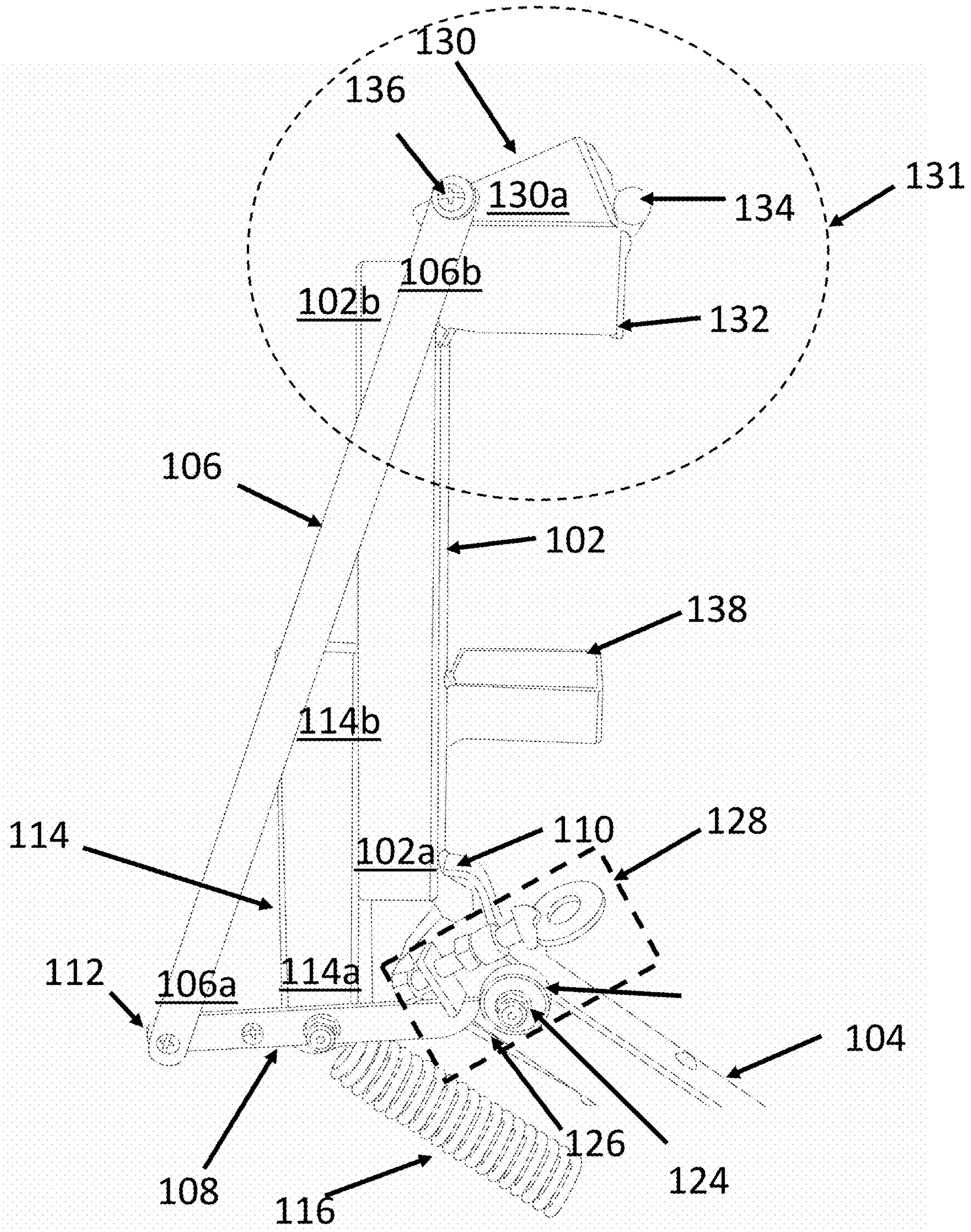
FIG. 7 is another exemplary depiction of a side perspective fishing rod holder in armed position according to the present invention.
Figure 8:
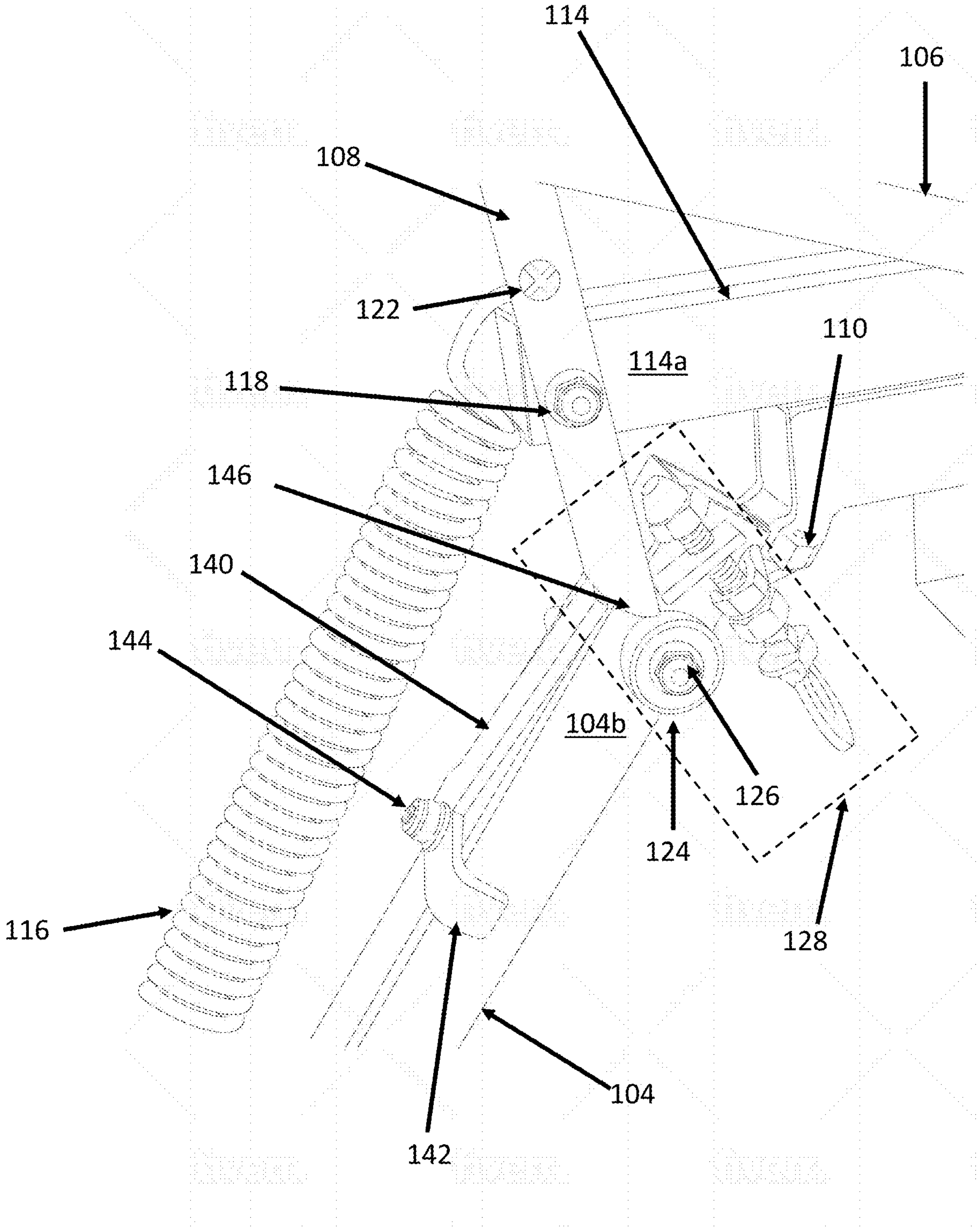
FIG. 8 is a depiction of the trigger setting mechanism according to the present invention.

With brief reference to FIG. 6, pivot limiting hinge 110 limits first elongated member 104 pivoting relative to second elongated member 102, such that first elongated member 104 is prevented from contacting second elongated member surface 107. In this way, when a fish is hooked and pulls the fishing line 168 tight, the pivot limiting hinge 110 ensures that the fishing pole 162 is not ripped from the fishing rod holder 100.

Figure 3:
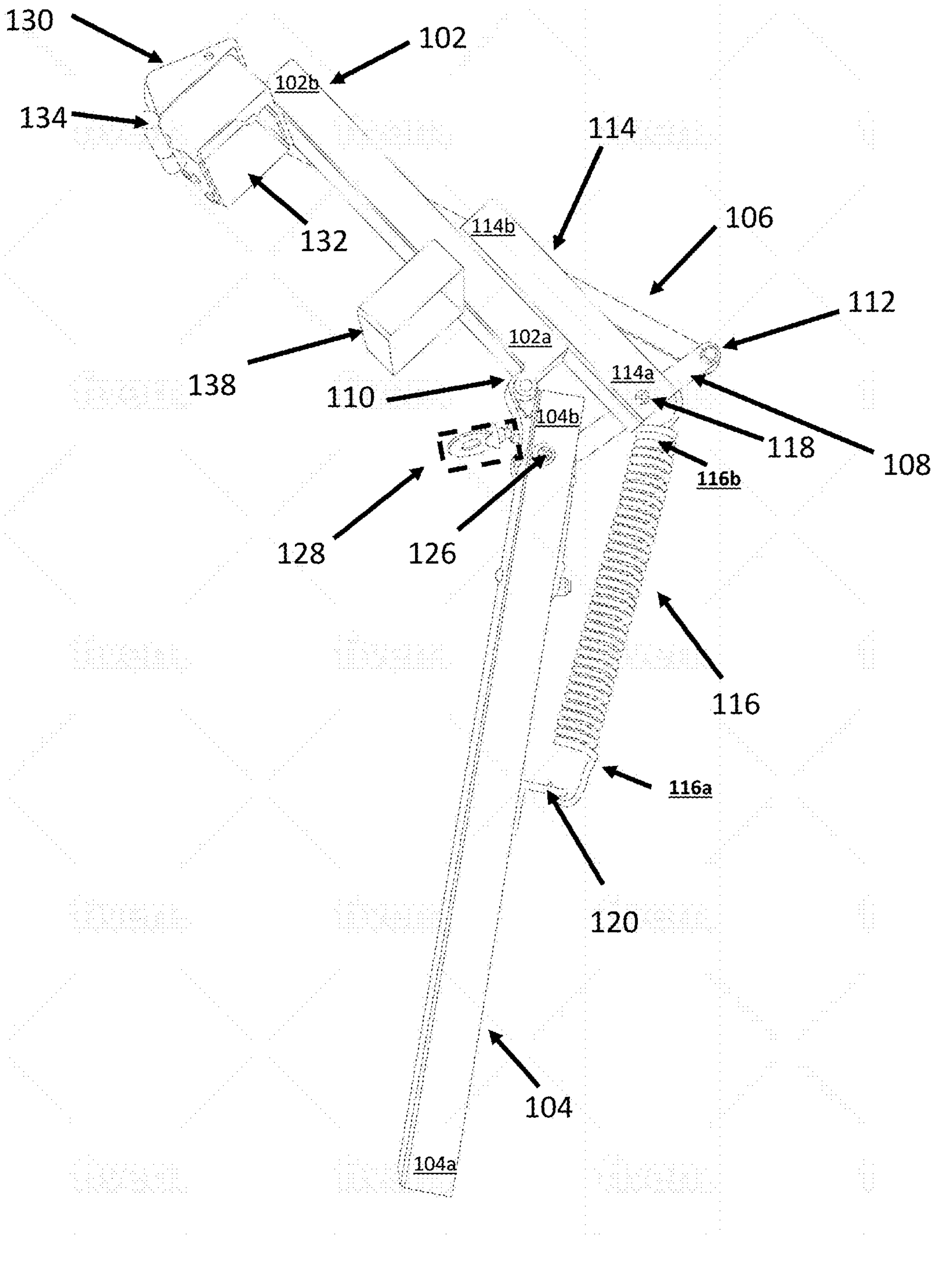
FIG. 3 is an exemplary depiction of a side perspective fishing rod holder in armed position according to the present invention.

With reference to FIGS. 1-3, fishing rod holder 100 further includes a third elongated member 114. Third elongated member 114 further includes a third elongated member proximal end 114*a*, a third elongated member distal end 114*b*, a third elongated member first elongated surface 109, a third elongated member second elongated surface 111, a third elongated member third elongated surface 113, wherein the third elongated member first elongated surface 109 is affixed the second elongated member first elongated surface 109.

Figure 4:
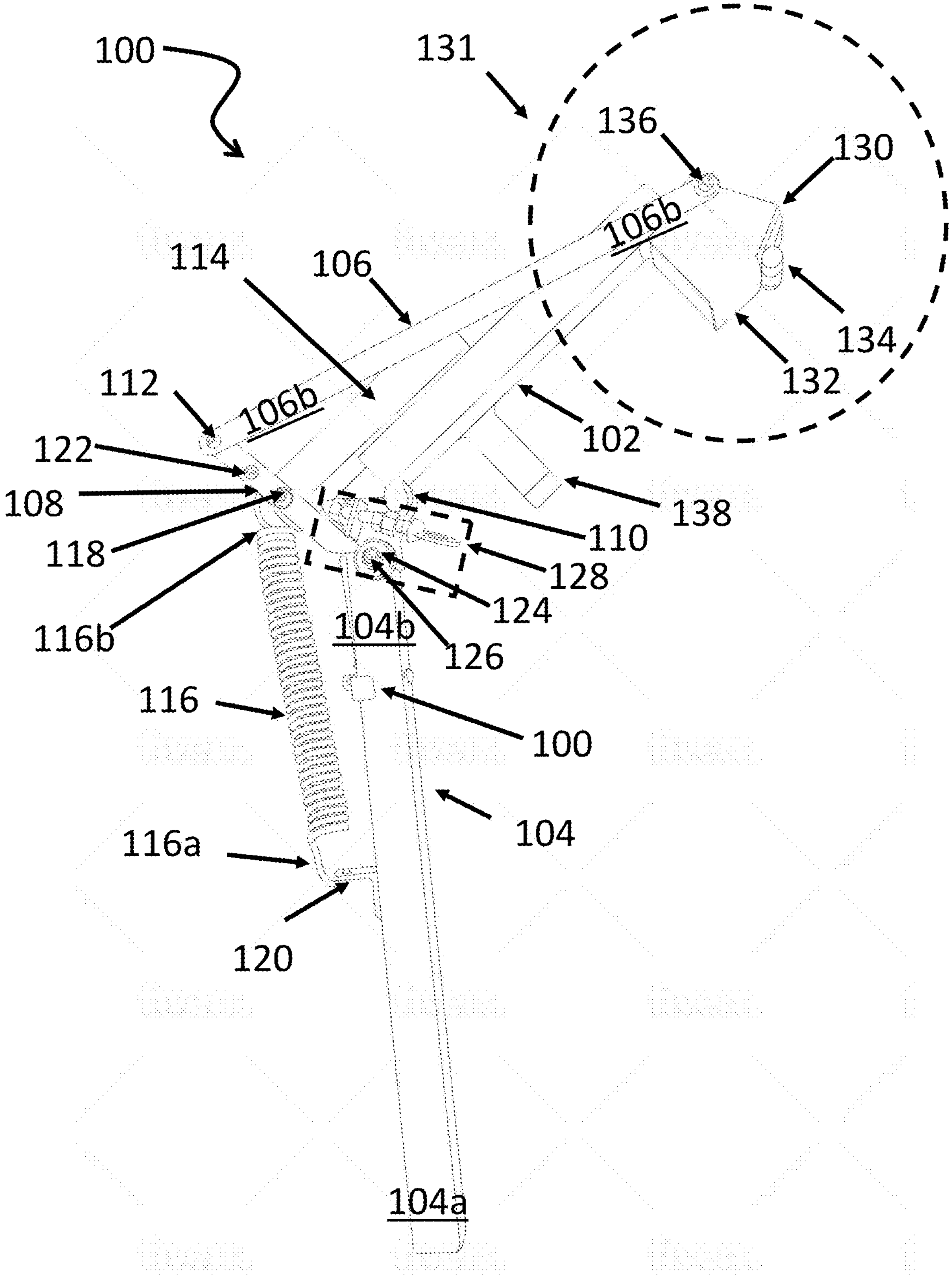
FIG. 4 is another exemplary depiction of a side perspective fishing rod holder in armed position according to the present invention.

With reference to FIG. 4 fishing rod holder 100 further includes a coil spring 116 having a coil spring first end 116*a* and a coil spring second end 116*b*, wherein the coil spring second end 116*b* is affixed to the third elongated member proximal end 114*a*, and wherein the coil spring first end 116*a* is affixed to the first elongated member first elongated surface 101. In one exemplary embodiment, coil spring 116 second end 116*b* may be affixed in proximity to first elongated member first surface midpoint 101*a*.

With reference to FIGS. 1-4, 6 and 7, fishing rod holder 100 further includes a first rigid loop 138 affixed to the second elongated member 102. In one exemplary embodiment, first rigid loop 138 is affixed between the second elongated member proximal end 102*a* and the second elongated member distal end 102*b*.

Referring now to FIGS. 6-10, fishing rod holder 100 further includes a trigger 131 affixed to second elongated member distal end 102*b*. Trigger 131 comprises a trigger first loop 132, wherein the trigger first loop 132 includes a trigger first loop first section 132*a* and a trigger first loop second section 132*b*, wherein the trigger first loop first section 132*a* and the trigger second loop second section 132*b* are diametrically opposite one to the other.

Trigger 131 further includes a trigger second loop 130, wherein the trigger second loop 130 includes a trigger second loop first section 130*a* and a trigger second loop second section 130*b*. Trigger first loop first section 130*a* and the trigger second loop second section 130*b* may be perpendicular one to the other. Trigger first loop first section 132*a* is affixed to the second elongated member second elongated surface 107. wherein the trigger first loop second section 132*b* is pivotably connected to the trigger second loop first section 130*b*.

Trigger 131 further includes an actuating arm 106. Actuating arm 106 is configured to move simultaneously to movement of trigger second loop 130. Actuating arm 106 includes an actuating arm proximal end 106*a* and an actuating arm distal end 106*b*. Trigger second loop second section 130*a* is pivotably connected to the actuating arm distal end 106*b*, using for example, a pivot point 136 to ensure that trigger second loop second section 130*a* pivots with respect to actuating arm distal end 106*b*.

Fishing rod holder 100 further includes a trigger setting mechanism 128. Trigger setting mechanism 128 is affixed to the first elongated member second elongated face 101.

Figure 10:
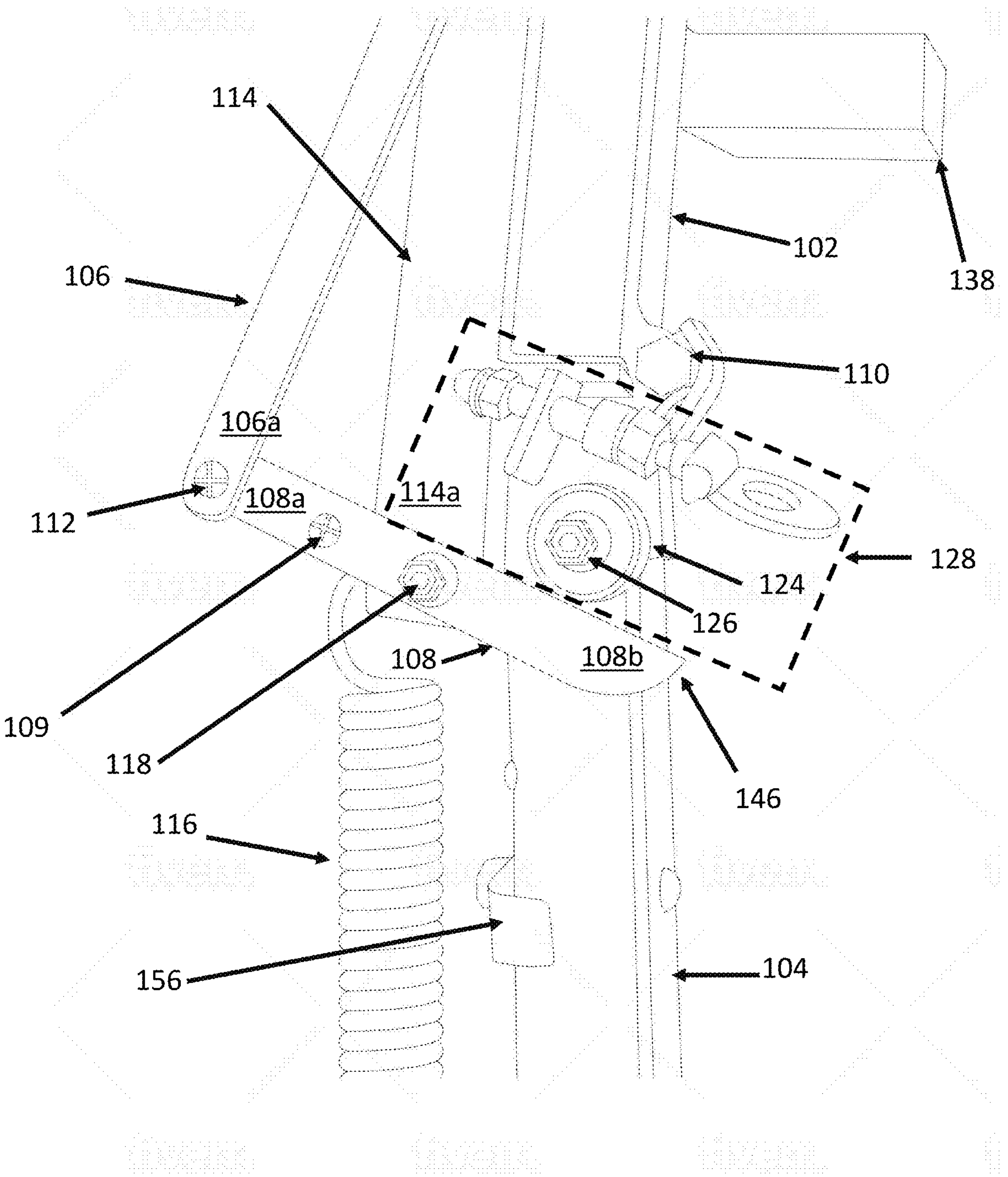
FIG. 10 is still another depiction of the trigger setting mechanism according to the present invention.

With reference to, for example, FIG. 10, fishing rod holder 100 also includes an elongated trigger setting member 108. Elongated trigger setting member 108 includes an elongated trigger setting member proximal end 108*a*, and an elongated trigger setting member distal end 108*b*.

Elongated trigger setting member distal end 108*b* is convex on a first side 146. Elongated trigger setting member distal end 108*b* is convex to a point on a first side 146, and wherein elongated trigger setting member distal end 108*b* opposite convex first side 146 comprises a straight edge. Elongated trigger setting member distal end 108*b* is formed such that second elongated trigger distal end 108*b* on the first side is curved outwardly and to a point at second elongated trigger distal end 108*b*.

Elongated trigger setting member proximal end 108*a* is rotatably connected to actuating arm proximal end 106*a*, using, for example, a pivot point 112. Elongated trigger setting member 108 is further pivotably affixed to the third elongated member proximal end 114*a*. In one exemplary embodiment, elongated trigger setting member 108 is affixed to the third elongated member proximal end 114*a*, wherein the third elongated member proximal end 114*a* is pivotably affixed to elongated trigger setting member 108 using for example a pivot point 118. Third elongated member proximal end 114*a* is pivotably affixed to elongated trigger setting member 108 at a point on elongated trigger setting member 108 that is between the elongated trigger setting member proximal end 108*a* and elongated trigger setting member distal end 108*b*. In another exemplary embodiment, third elongated member proximal end 114*a* is pivotably affixed at a point proximate to the midpoint between elongated trigger setting member proximal end 108*a* and elongated trigger setting member distal end 108*b*. In still another exemplary embodiment, third elongated member proximal end 114*a* is pivotably affixed to the midpoint between elongated trigger setting member proximal end 108*a* and elongated trigger setting member distal end 108*b*.

In still another exemplary embodiment, elongated trigger setting member 108 further includes a stop stud 109, for restricting the pivoting of elongated trigger setting member 108 relative to third elongated member 114.

Figure 9:
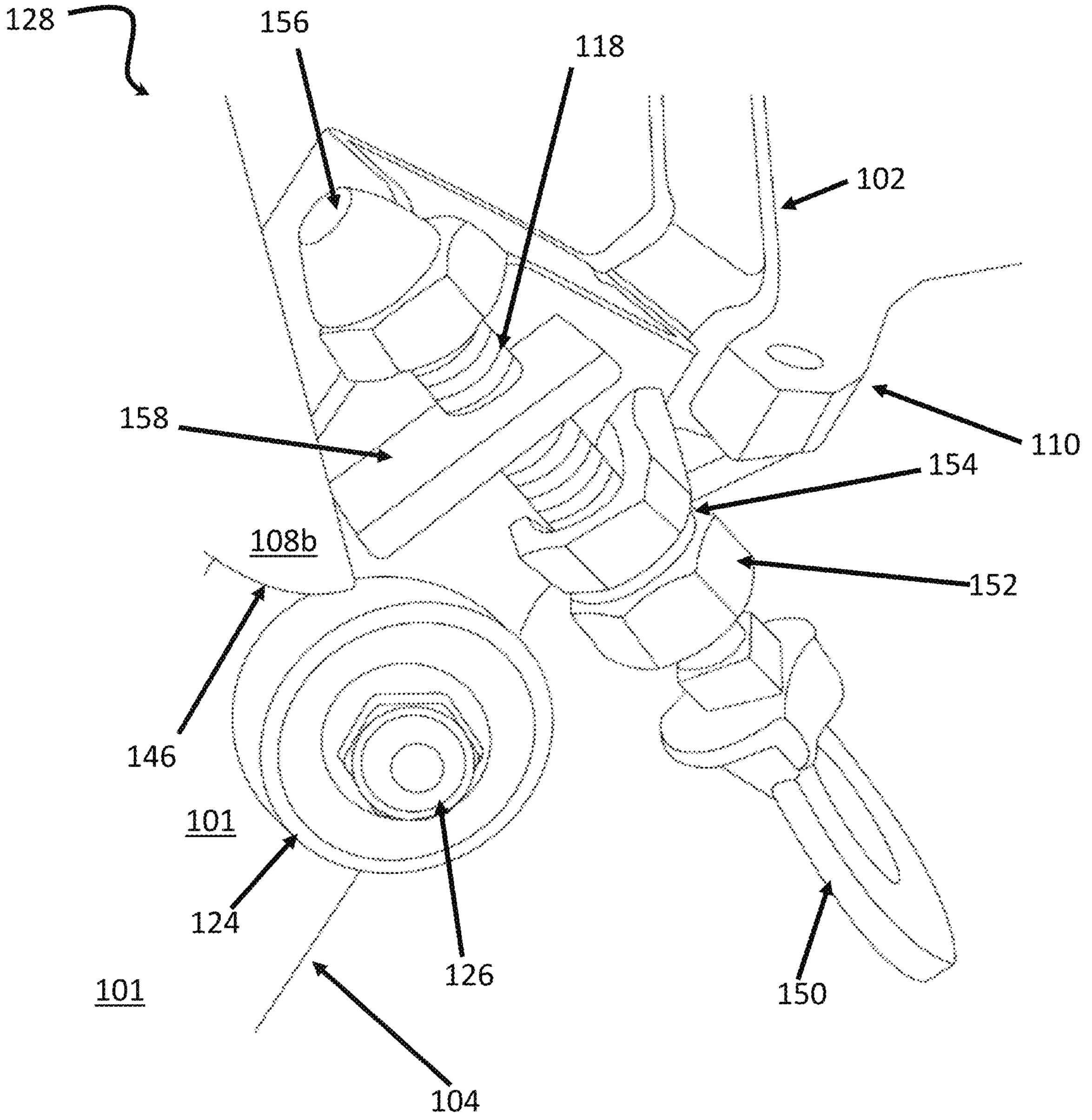
FIG. 9 is another depiction of the trigger setting mechanism according to the present invention.

With reference to FIG. 10 and continued reference to FIG. 9, fishing rod holder 100 further includes a trigger setting mechanism 128. Trigger setting mechanism 128 includes a tension setting disk 124 affixed to the first elongated member first elongated surface 101. Tension setting disk 124 may be affixed to first elongated member first elongated surface 101 using, for example, a fastener 126.

Tension setting disk 124 may be affixed to the first elongated member first elongated surface 101 such that is abuts elongated trigger setting member distal end 108*b*. In another exemplary embodiment, tension setting disk 124 may be affixed to the first elongated member first elongated surface 101 such that may abut elongated trigger setting member distal end 108*b*. Tension setting disk 124 may be affixed to the first elongated member first elongated surface 101 such that the outer edge of the tension setting disk 124 may abut elongated trigger setting member distal end 108*b* on its convex edge, as described for fully below. Tension setting disk 124 may be affixed to the first elongated member first elongated surface 101 such that the outer edge of the tension setting disk 124 may abut elongated trigger setting member distal end 108*b* on its curved edge. Tension setting disk 124 may be affixed such that movement of the elongated trigger setting member 108 causes elongated trigger setting member distal end 108*b* to move along the outer edge of tension setting disk 124. Tension setting disk 124 may be affixed to the first elongated member first elongated surface 101 using, for example, a screw 126, rivet, or the like, affixed through the tension setting disk 124 central axis which allows tension setting disk 124 to freely rotate on the tension setting disk 124 central axis.

Trigger setting mechanism 128 may further include a trigger setting tension set screw 150. Trigger setting tension screw 150 may be affixed to first elongated member first elongated face 101 using a first anchor 154 and a second anchor 157. Anchor 154 and anchor 157 are affixed to first elongated member first elongated face 101. Anchor 154 and anchor 152 are configured to permit trigger setting tension screw 150 to traverse through anchor 154 and anchor 157. Anchor 154 and anchor 157 are configured to permit trigger setting tension screw 150 to rotate freely through anchor 154 and anchor 157.

Tension screw 150 further includes a tension screw retention cap 156 affixed to a tension screw 150 first end, where the tension screw 150 first end is opposite the end the tension screw 150 that is manually actuated by a user. In this way, tension screw retention cap 156 acts to restrict the movement of tension screw 150 from anchor 154 and anchor 157. Tension screw retention cap 156 ensures that tension screw 150 remains within anchor 154 and anchor 157. Similarly, tension setting mechanism 128 further includes a guard 152 affixed to tensing screw 150, for restricting the movement of tension screw 150 through anchor 154 and 157.

Trigger setting mechanism 128 may further include a tensing setting plate 158. Trigger setting plate 158 is affixed to trigger setting tension setting screw 150, such that as screw 150 is turned, tension setting plate 158 moves along tension screw 150 central axis. Trigger setting plate 158 may be affixed such that one plane of the trigger setting plate is perpendicular to tension screw 150.

Tension setting plate 158 may be affixed to tension setting screw 150 such that an edge of tension setting plate 158 may be placed in abutment with elongated trigger setting member distal end 108*b* straight edge when the fishing rod holder 100 is being arranged for use in hooking a fish. A user may cause the concave edge of the elongated tension setting member distal end 108*b* to come in contact with tension setting disk 124 outer edge. In particular, a user may adjust tension setting screw 150 such that tension setting plate restricts the amount of travel the elongated trigger setting member distal end 108*b* concave portion may travel along the perimeter of tension setting disk 124. In this way, the user can establish the sensitivity at which fishing rod holder 100 may respond to a fish biting the hook 170.

When a user turns ("rotates") tension setting screw 150, tension setting plate 158 moves the elongated tension screw 150 to control the amount of the elongated trigger setting member distal end 108 convex edge will angularly contact the tension setting disk 124 outer edge (i.e., tenson setting disk perimeter) when the fishing rod holder is activated, as described more fully below. Briefly, a user may rotate tension screw 150 such that tension setting plate 158 restricts the amount of contact elongated trigger setting member convex edge 146 will have with tension setting disk 124 outer edge when fishing rod holder 100 hooks a fish.

The angular contact distance travelled can be measured by measuring the angular distance the elongated trigger setting member curved distal end 108*b* travels along the tension setting disk 124 outer edge. The greater the angular distance traveled, the harder it is to trigger the fishing rod holder 100 to hook a fish. That is, a user may control the sensitivity of the trigger by controlling the distance the elongated trigger setting member curved distal end 108*b* travels along tension setting disk 124 outer edge. Additionally, the movement of the elongated trigger setting member convex edge 146 along the tension setting disk 124 outer edge affects the energy stored in the spring 116. For example, the greater the angular distance traveled corresponds to the recoil energy stored in spring 116.

Figure 5:
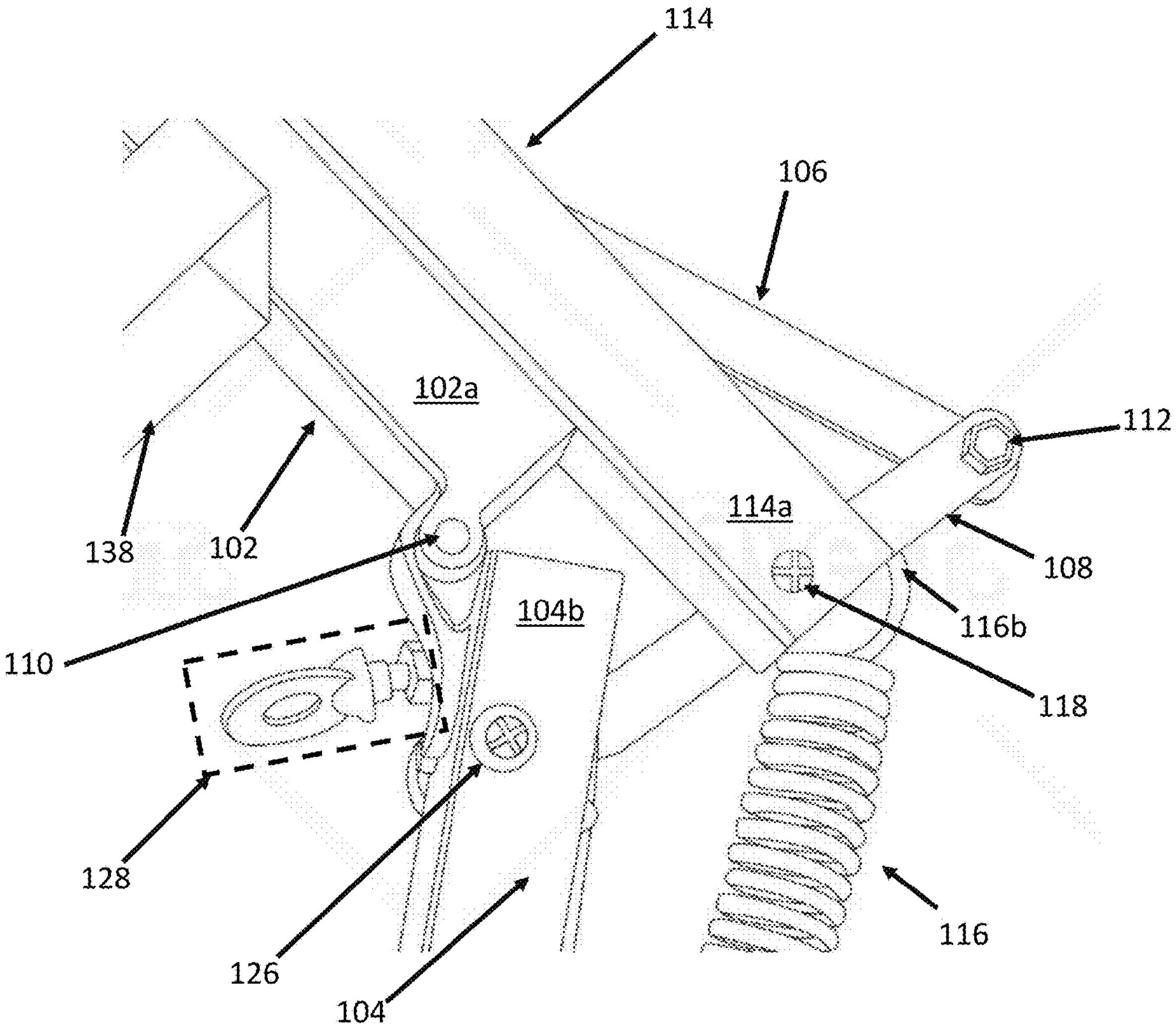
FIG. 5 is an exemplary depiction of the pivot points for elongated members of the fishing rod holder according to the present invention.

Referring now to FIG. 5, fishing rod holder 100 further includes a trigger safety for ensuring that the elongated trigger setting member 108 does not move once fishing rod holder 100 is set to hook a fish. For example, when the user arranges fishing rod holder 100 such that elongated trigger setting member curved distal end 108*b* is abutting tension setting disk 124 outer edge, the fishing rod holder 100 trigger safety is configured to restrict movement of elongated trigger setting member curved distal end 108*b* relative to the tension setting disk 124.

An exemplary trigger safety according to the present invention can be seen in FIG. 6. Exemplary trigger safety according to this invention may include a first elongated safety bar 140 that is pivotably attached to first elongated member first elongated surface 101. First elongated safety bar 140 may be pivotably attached to first elongated member 104 using for example a screw 144 which allows first elongates safety bar 140 to rotate. In some instances, elongated safety bar 140 may include a support bar 142 for permitting that elongated safety bar 140 rotates to restrict the movement of elongated trigger setting member curved distal end 108*b* relative to tension setting disk 124.

During operation, a user (i.e., fisherman) will receive fishing rod holder 100 in a resting position as shown in FIG. 1. As can be seen, when fishing rod holder 100 is in a resting position, spring 116 has no recoil energy stored in it. The operation of and essence of a spring and the recoil energy stored in a spring is well known. As such the operation of the spring will not be discussed herein for brevity. It should be noted that the recoil energy operates to return the spring 116 to its resting state.

However, to hook a fish, the fisherman must first arm the fishing rod holder to recoil when the trigger 131 is activate. Prior to arming the dishing rod holder 100, the fisherman must set the tension screw 128 how much for is required to activate the fishing rod holder to hook a fish. The fisherman establishes the force to activate the fishing rod holder 100 by rotating tension screw 128 to control the distance the elongated trigger setting member distal end 108*b* traverses tension setting disk outer edge. In this way, the fisherman can set his desired tension. Greater tension means it takes a greater force to activate the fishing rod holder to hook a fish.

To "arm" fishing rod holder 100 for hooking fish, the user may pivot second elongated member 102 relative to first elongated member 104 along pivot point 134. FIGS. 3-4, 12-13 show fishing rod holder 100 in an armed position wherein spring 116 has recoil energy attempting to return fishing rod holder 100 in the resting position.

As can be seen, arming fishing rod holder 100 causes trigger second loop 130 to pivot relative to trigger first loop 132 around pivot point 134. Additionally, actuating arm 106 moves as trigger second loop 130 moves. That is, movement of trigger second loop 130 correlates to the movement of trigger second loop 130.

The movement of actuating arm 106 causes movement of elongated trigger setting member 108. Elongated trigger setting member distal end **108*b* curved edge is then made to traverse the edge of the tension setting disk 124. Once the elongated trigger setting member distal end 108*b* curved edge is set on the tension setting disk 124 according to the desired tension, the fisherman may secure desired tension by setting the safety bar 140 to restrict movement of elongated trigger setting member distal end 108*b* curved edge along tension disk 124 outer edge. Safety bar 140 may restrict movement of elongated trigger setting member distal end 108*b* curved edge along tension disk 124 outer edge by abutting the elongated trigger setting member 108 to prevent rotation of the elongated trigger setting member 108 relative to third elongated member 114**.

The action of pivoting second elongated member 102 relative to first elongated member 104 causes spring 116 to store energy (i.e., "recoil energy"). When the trigger 131 is activated, the recoil energy stored in spring 116 causes the fishing rod holder 100 to forcefully return back (e.g., snap back) to its resting position. By "activated" what may be meant is that fishing rod holder 100 is actuated to hook a fish.

The present invention is described with respect to the fishing rod holder 100 "hooking a fish," or "activating to hook a fish." When used herein with respect to the fishing rod holder 100, the terms "hooking a fish" or "activating to hook a fish," or the like, refer to the fishing rod holder 100 using a conventional rod 162 and hook 170 to hook the fish. That is, during use, a conventional fishing rod 162 is included in fishing rod holder 100 for use in hooking a fish.

Figure 11:
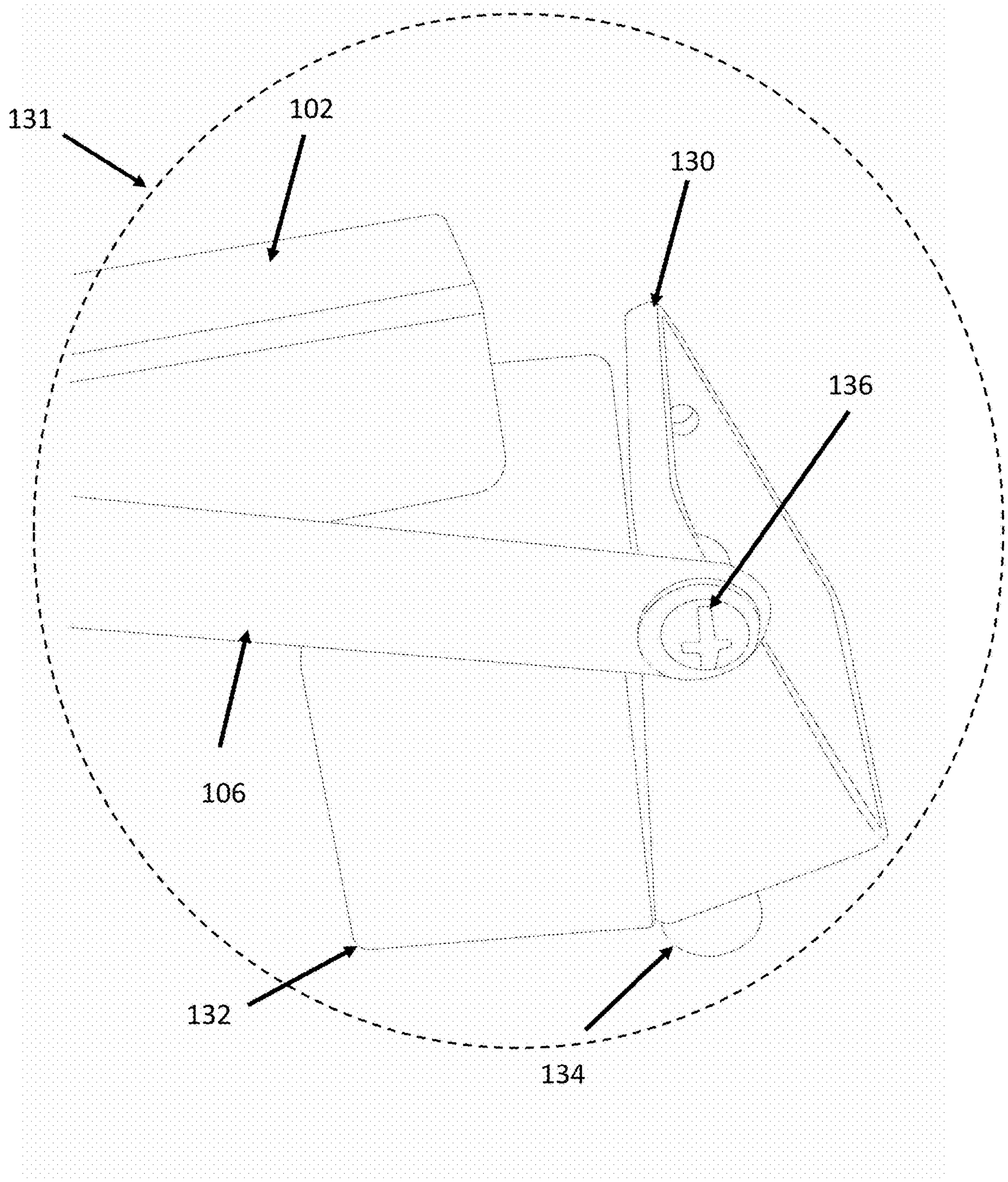
FIG. 11 is a depiction of the trigger according to the present invention.
Figure 12:
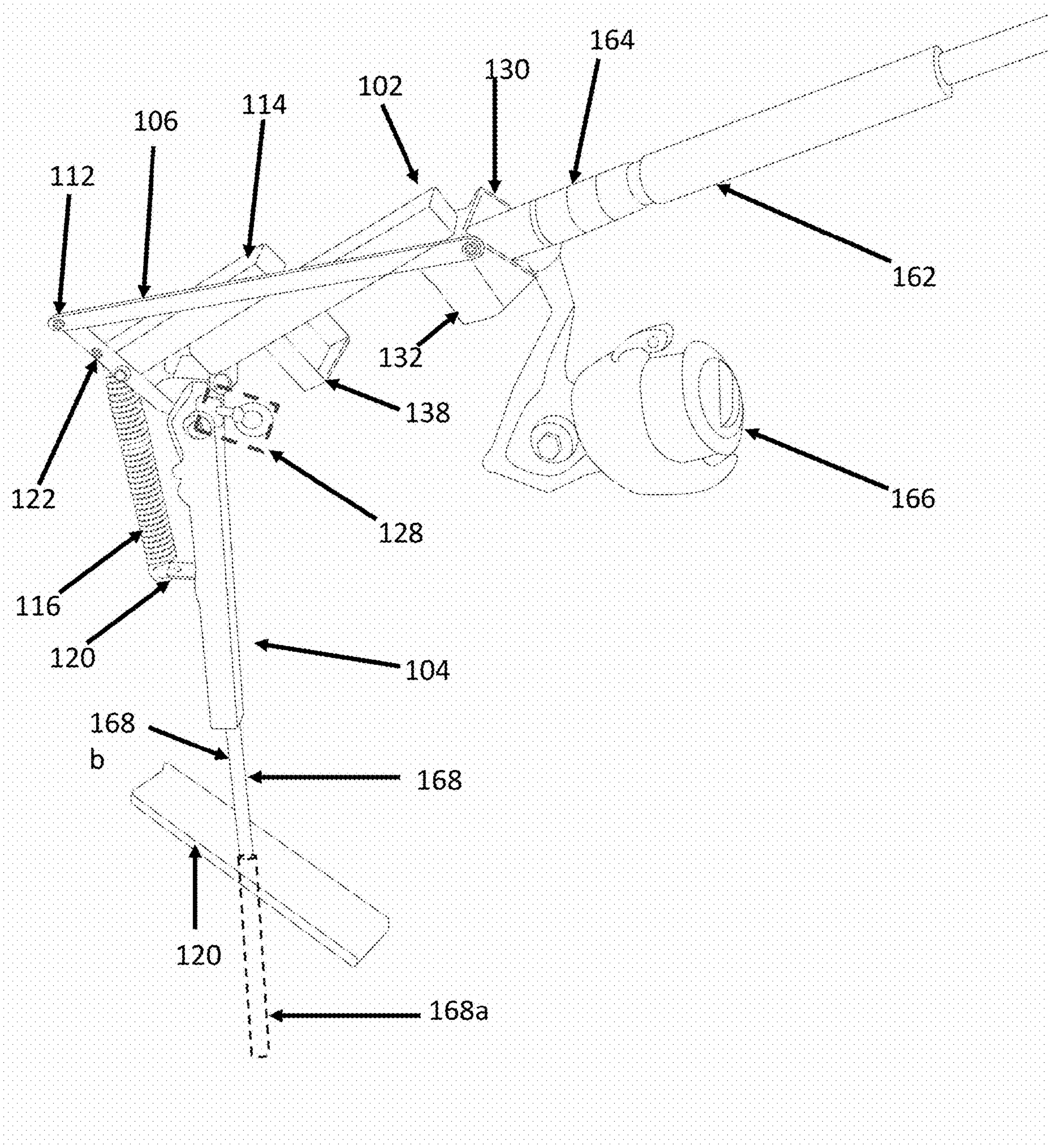
FIG. 12 is an exemplary illustration of the fishing rod holder in use with a conventional fishing rod.
Figure 13:
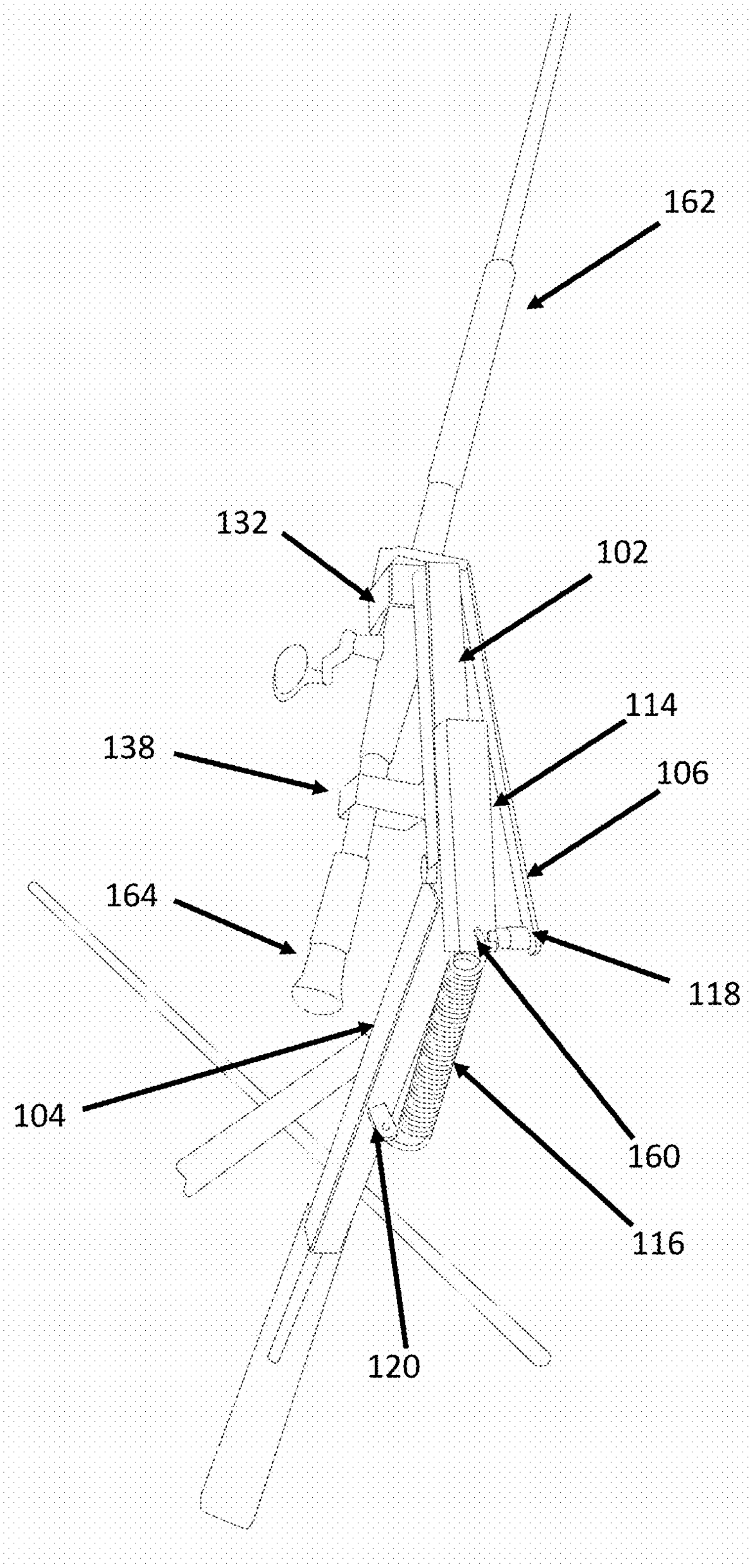
FIG. 13 is another exemplary illustration of the fishing rod holder in use with a conventional fishing rod.

FIG. 11 and FIG. 12 depict a conventional fishing rod 162 included in fishing rod holder 100. As shown, fishing rod handle 164 is inserted through trigger 131 and through first rigid loop 138. As shown, fishing rod handle 164 is preferably inserted through trigger first loop 132 and trigger second loop 130. In one preferred embodiment, fishing rod 162 may be inserted into trigger 131 such that reel 166 rest on trigger second loop 130.

In one operation of fishing rod holder 100, once the fishing rod holder 100 is put in "armed" position, the conventional fishing rod 162 is inserted in the fishing rod holder 100, and fishing reel 166 is made to come to rest on first loop 132, the fishing rod holder 100, including the fishing rod 162, is "armed." By armed, what is meant is that the coil 116 has stored recoil energy.

Typically, a fisherman may place bait on hook 172 to entice a fish to bite the hook 172. The biting action of the fish causes movement on the fishing line 168, which is detected at staff 172. When a fish bites the hook, the fish ordinarily moves the bait away from the fishing rod holder 100. Specifically, the fish biting on the bait and hook 170 causes the staff 172 to move toward the direction the fish is pulling the hook 170 (the "pulling movement").

The pulling movement causes trigger second loop 130 to pivot around pivot point 134. In one embodiment, the pulling movement causes trigger second loop 130 to pivot relative to trigger first loop 132. Trigger second loop 130 will ordinarily pivot down and away from the second elongated member distal end **102*b*. The pivoting of trigger second loop 130 causes actuating arm 196 to move toward the direction of trigger second loop 130. The movement of actuating arm 196 toward the trigger second loop 130 causes elongated trigger setting member 108 to pivot around pivot point 118 with respect to third elongated member 114**.

As noted, a fisherman may adjust the distance the elongated trigger setting member distal end **108*b* travels along tension setting disk 124 outer edge. The fisherman adjusts the distance (e.g., the tension or sensitivity at which the fishing rod holder 100 actuates) by adjusting tension setting screw 128 to restrict or regulate the amount of perimeter surface to be travelled by the elongated trigger setting member distal end 108*b* along tension setting disk 124. For example, if a fisherman sets tension setting screw 128** such that maximum distance is traversed then the maximum amount of tension is achieved.

As the elongated trigger setting member 108 pivots relative to third elongated member 114, elongated trigger setting member distal end **108*b* traverses the outer edge of tension setting disk 124. Once elongated trigger setting member distal end 108*b* traverses the outer edge of tension setting disk 124 and is no longer in contact with the outer edge of tension setting disk 124, then fishing rod holder 100 is actuated and the recoil energy stored in spring 116 is instantly released causing the fishing rod hold 100** to spring to the rest position.

In one exemplary embodiment, the elongated trigger setting member distal end **108*b* includes friction between the outer edge of tension setting disk 124 and the elongated trigger setting member distal end 108*b* when fishing rod holder 100 is set, and no friction exists between the outer edge of tension setting disk 124 and the elongated trigger setting member distal end 108*b* when fishing rod holder 100 after the fishing rod holder 100 is actuated. Moreover, the recoil energy stored in spring 116 causes fishing rod holder 100 causes recoil energy to forcefully and suddenly return fishing rod holder 100 to the rest position. The sudden return of the fishing rod holder 100 to the rest position hooks the fish moving the hook 170**, thereby hooking the fish.

In one particular embodiment, as shown in FIG. 12, fishing rod holder 100 may further include a fishing rod stand having a vertical member 168 affixed to an elongated horizontal member 120. Horizontal member 120 may be planar in shape. Vertical member 168 extends completely through horizontal member 120. In one embodiment, vertical member 168 includes a vertical member lower extension **168*a* extends down from the planar surface of the horizontal member 120. Vertical member 168 includes a vertical member upper extension 168*b* extends upwardly from the planar surface of the horizontal member 120**.

First elongated member 104 may be hollow. In accordance with one embodiment of the invention, during operation, vertical member upper extension **168*b* may be inserted into the hollow first elongated member proximal end 104*a*. Vertical member lower extension 168*a* may be inserted into the ground to stabilize fishing rod holder 100 to facilitate the optimal recoil action of the spring 116**.

Figure 14:
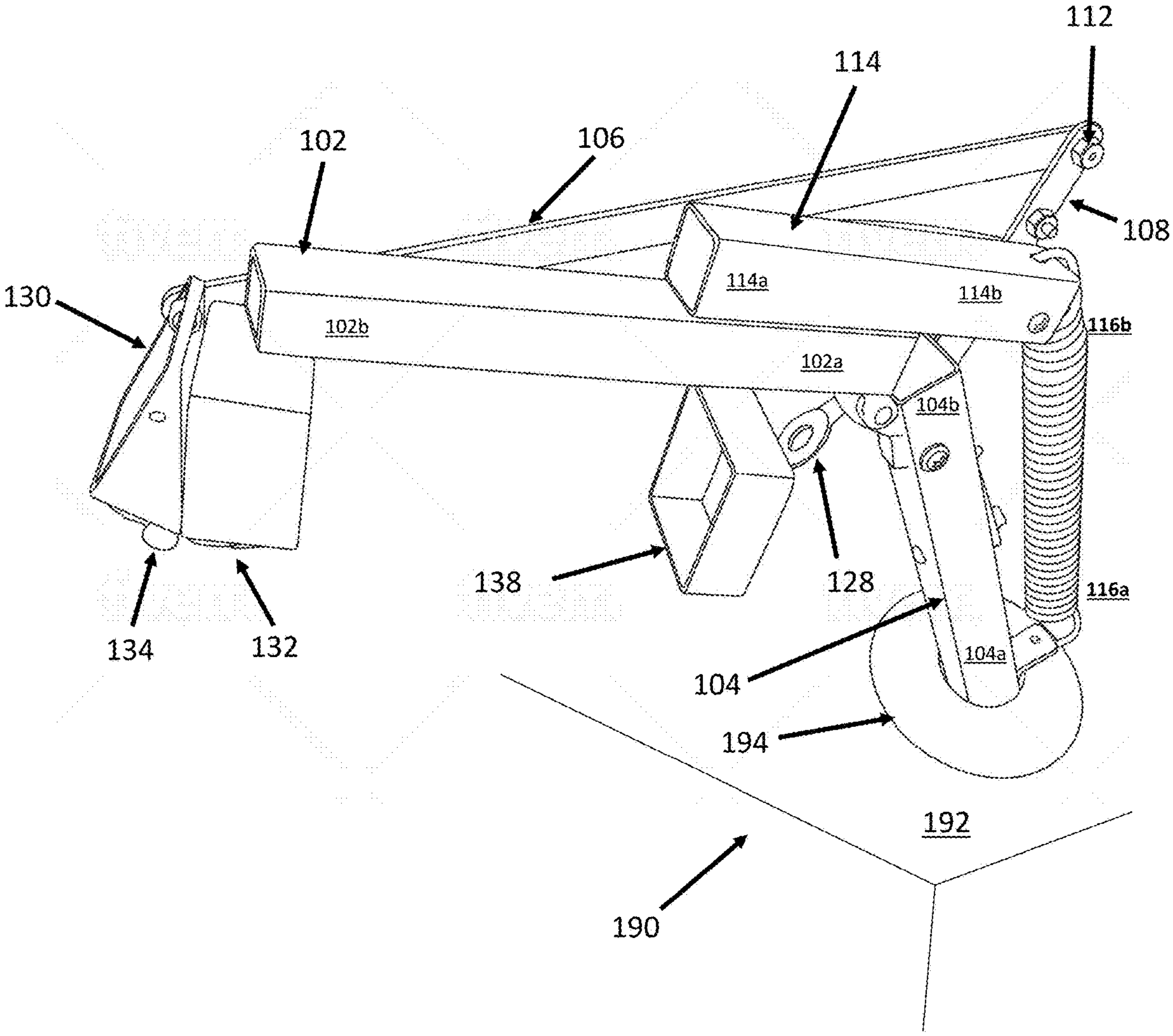
FIG. 14 is an exemplary fishing rod holder according to the present invention inserted in a boat gunwale according to various embodiments of the present inventions.

In some instances, as shown in FIG. 14, fishing rod holder 100 may be used on a watercraft having traditional a watercraft hull 190 and a gunwale 192. In one embodiment, fishing rod holder 100 may include vertical member 168 for inserting in the first elongated member proximal end **104*a* to secure the fishing rod in gunwale 192. In one embodiment, gunwale 192 may include an aperture 194 included in gunwale 192 useful for inserting vertical member 168** therein. In another exemplary embodiment, fishing rod first elongated member 104 may be inserted in aperture 194 without use of vertical member 168.

The present invention is discussed with reference to a conventional fishing rod 162 including a fishing reel 162, the invention is useful with any conventional fishing rod. For example, the fishing rod holder 100 of the present invention may be used with a fishing rod without a reel. It should be understood that modifications made to the invention that are known to one skilled in the are included herein.

What is claimed is:

1. A fishing rod holder for automatically hooking a fish comprises:

a. a first elongated member, the first elongated member including a first elongated member proximal end, a first elongated member distal end, a first elongated member first elongated surface, a first elongated member second elongated surface, a first elongated member first elongated surface midpoint, wherein the first elongated member midpoint is located between the first elongated member proximal end and the first elongated member distal end;

b. a second elongated member, the second elongated member including a second elongated member proximal end, a second elongated member distal end, a second elongated member first elongated surface, a second elongated member second elongated surface, wherein the second elongated member includes a second elongated member first elongated surface midpoint, wherein the second elongated member first elongated surface midpoint is located between the second elongated member proximal end and the second elongated member distal end, wherein the first elongated member distal end is pivotably connected to the second elongated member proximal end;

c. a third elongated member, the third elongated member including a third elongated member proximal end, a third elongated member distal end, a third elongated member first elongated surface, a third elongated member second elongated surface, a third elongated member third elongated surface, wherein the third elongated member first elongated surface is affixed the second elongated member first elongated surface;

d. a coil spring having a coil spring first end and a coil spring second end, wherein the coil spring first end is affixed to the third elongated member proximal end, and wherein the coil spring second end is affixed to the first elongated member first elongated surface;

e. a first rigid loop affixed to the second elongated member, wherein said first rigid loop is affixed between the second elongated member proximal end and the second elongated member distal end;

f. a trigger affixed to the distal end of the second elongated member;

g. a trigger setting mechanism affixed to the first elongated member second elongated face;

h. a trigger safety affixed to the first elongated member first elongated face; and i. an actuating arm have an actuating arm proximal end and an actuating arm distal end, wherein the actuating arm distal end is rotatably affixed to the trigger, and wherein the actuating arm proximal end is rotatably affixed to the trigger setting mechanism, wherein the trigger first loop includes a trigger first loop first section and a trigger first loop second section, wherein the trigger first loop first section and the trigger second loop second section are diametrically opposite, wherein the trigger further includes a trigger second loop, wherein the trigger second loop includes a trigger second loop first section and a trigger second loop second section, wherein the trigger first loop first section and the trigger second loop second section are diametrically opposite, wherein the trigger first loop first section is affixed to the second elongated member first elongated surface, wherein the trigger first loop second section is pivotably connected to the trigger second loop first section, and wherein the trigger second loop second section is rotatably connected to the actuating arm proximal end.

2. The fishing rod holder according to claim 1, wherein the trigger setting mechanism includes:

a. an elongated trigger setting member, wherein said elongated trigger setting member includes an elongated trigger setting member proximal end and an elongated trigger setting member distal end, wherein said elongated trigger setting member proximal end is convex, wherein the elongated trigger member is rotatably connected to actuating arm proximal end, wherein the elongated trigger member is further rotatably affixed to the distal end of the third elongated member;

b. a tension setting disk affixed to the distal end of the first elongated member second elongated face;

c. a trigger setting tension set screw affixed to the first elongated member second elongated face.

3. A fishing rod holder for automatically hooking a fish, comprising:

a first elongated member having a proximal end and a distal end;

a second elongated member having a proximal end and a distal end, the proximal end of the second elongated member being pivotably coupled to the distal end of the first elongated member;

a rod-support structure mounted to the second elongated member and configured to receive and support a fishing rod such that a gravitational force generated by a weight of the fishing rod establishes a resting force condition that biases the second elongated member toward an armed position;

a spring coupled between the first elongated member and a third elongated member, the spring being configured to store energy when the fishing rod holder is maintained in the armed position;

a trigger mechanism coupled to the second elongated member, the trigger mechanism comprising:

(a) a trigger including a first loop and a second loop, the first loop being affixed to the second elongated member and the second loop being pivotably coupled to the first loop;

(b) an actuating arm having a proximal end and a distal end, the distal end of the actuating arm being rotatably coupled to the trigger; and (c) a trigger-setting mechanism rotatably coupled to the proximal end of the actuating arm;

wherein the trigger mechanism restrains release of stored energy of the spring while the resting force condition established by the weight of the fishing rod is maintained;

wherein a fish strike transmitted through a fishing line applies a force opposing the resting force condition, thereby overcoming the resting force condition and causing release of the trigger mechanism without requiring direct actuation of the trigger mechanism by fishing-line tension alone;

a trigger-tension adjustment assembly comprising a disk and a movable plate arranged to limit movement of the trigger-setting mechanism to selectively vary a sensitivity at which the opposing force causes release of the trigger mechanism;

an angle-limiting stop configured to limit angular travel of the second elongated member following release of the trigger mechanism to prevent removal of the fishing rod from the rod-support structure; and a safety mechanism selectively operable to prevent release of the stored energy of the spring during loading of the fishing rod holder.

* * * * *